United States Patent [19]

Schindler et al.

[11] 4,454,085
[45] Jun. 12, 1984

[54] PROCESS FOR PRODUCING ASYMMETRICAL HOLLOW FILAMENT MEMBRANES OF POLYAMIDE

[75] Inventors: Erich Schindler; Franz Maier, both of Obernburg, Fed. Rep. of Germany

[73] Assignee: Akzo NV, Arnhem, Netherlands

[21] Appl. No.: 421,112

[22] Filed: Sep. 20, 1982

[30] Foreign Application Priority Data

Sep. 28, 1981 [DE] Fed. Rep. of Germany ....... 3138525

[51] Int. Cl.³ ............................................... B01D 39/16
[52] U.S. Cl. ...................................... 264/41; 264/561; 264/209.5; 428/398
[58] Field of Search ...................... 428/398; 210/500.2; 264/177 F, 561, 41, 209.5

[56] References Cited

U.S. PATENT DOCUMENTS

| | | | |
|---|---|---|---|
| 3,551,331 | 12/1970 | Cescon et al. | 210/500.2 |
| 3,605,162 | 9/1971 | Long | 428/398 |
| 3,710,945 | 1/1973 | Dismore | 210/500.2 |
| 3,724,672 | 4/1973 | Leonard et al. | 210/500.2 |
| 4,291,096 | 9/1981 | Taylor | 210/500.2 |
| 4,323,627 | 4/1982 | Joh et al. | 264/41 |
| 4,340,481 | 7/1982 | Mishiro et al. | 210/500.2 |

FOREIGN PATENT DOCUMENTS

| | | | |
|---|---|---|---|
| 45435 | 2/1982 | European Pat. Off. | 210/500.2 |
| 49-133614 | 12/1974 | Japan | 264/177 F |
| 50-35418 | 4/1975 | Japan | 264/177 F |
| 53-19423 | 2/1978 | Japan | 264/177 F |
| 53-95183 | 8/1978 | Japan | 210/500.2 |

*Primary Examiner*—Jay H. Woo
*Attorney, Agent, or Firm*—Michael J. Striker

[57] ABSTRACT

A process is disclosed for the production of asymmetrical hollow filament membranes suitable for ultrafiltration and/or microfiltration, in which a spinning solution composed of a polyamide or a mixture of polyamides and/or copolyamides, formic acid and a coagulating core liquid, is extruded into a coagulating setting bath liquid, and the hollow filaments are stretched after leaving the setting bath, in the wet state. The pH-value-difference between core liquid and setting bath liquid should be at least 3. The spinning solution contains, in particular, 15 to 25% by weight polyamide, 5 to 20% by weight polyethylene glycol, up to 10% by weight customary additive and formic acid. Preferred embodiments include a stretching ratio amounting to between 1:1.5 and 1:2.5, and having core liquid and setting bath liquid chosen from various combinations of caustic soda, glycol, formic acid or polyethylene glycol. Also disclosed are hollow filament membranes in which the hollow filament is of uniform, eccentric or profiled shape.

11 Claims, No Drawings

PROCESS FOR PRODUCING ASYMMETRICAL HOLLOW FILAMENT MEMBRANES OF POLYAMIDE

BACKGROUND OF THE INVENTION

The invention concerns a process for the production of an asymmetrical hollow filament membrane suitable for ultrafiltration and/or microfiltration, through extrusion of a spinning solution of a polyamide or a mixture of polyamides and/or copolyamides with formic acid and a coagulating core liquid into a coagulating precipitation bath liquid different from the core liquid, and subsequent drying, and asymmetrical hollow filament membranes produced thereby.

German Offenlegungsschrift DE-OS No. 26 06 244 describes a process for the production of symmetrical hollow filament membranes, whereby the spinning solution, for example composed of a 15 to 25% polyamide solution, is provided with a pore-forming substance, for example a metal salt, after which a second solvent is added, in which the pore-forming substance dissolves but which is a non-solvent for the polyamide. This spinning solution is spun through customary ring nozzles, whereby through a core nozzle a coagulating core liquid is provided, for example water or alcohol or ketone dissolved in water, into the hollow space or cavity of the spun solution. The spinning solution must then be spun into air and first enters into a precipitation bath after a determined stretch of air. The coagulating precipitation bath liquid is likewise composed of water or an alcohol or ketone dissolved in water. After the termination of coagulation, the metal salt with the second solvent must be washed out, in a second bath.

It has now been discovered that it is possible, without addition of a pore-forming substance and through the choice of the core liquid and the precipitation bath liquid, to produce asymmetrical hollow filament membranes of polyamide. Due to the selection of a particular pore-forming substance, the second washing bath for washing out the pore-forming substance is superfluous. Through suitable choice of the coagulating core and precipitation bath liquids the pore gradient of the hollow filament membrane can be adjusted as desired.

SUMMARY OF THE INVENTION

It is therefore an object of the present invention to make available a simple and more favorable process for the production of a new hollow filament membrane from polyamide, asymmetrical and possessing a thin separating skin and a substantially thicker support layer.

This object is attained according to the present invention by a process of the above-described type, which is thereby distinguished in that the pH-value-difference between core liquid and precipitation bath liquid is at least 3 and the hollow filaments are stretched in the wet state after leaving the precipitation bath. In advantageous manner, the degree of stretching lies between 1:1.5 and 1:2.5.

Further particulars include that the spinning solution contain 15 to 25% by weight polyamide 5 to 20% by weight polyethylene glycol, up to 10% by weight customary additives and formic acid.

When the core liquid has a higher pH-value than the precipitation bath liquid, the result is that the pore size decreases from the inner to the outer membrane wall. In contrast, when the precipitation bath liquid has a greater pH-value than the core liquid, the pore size increases from the inner to the outer membrane wall. In view of this, pore sizes can be obtained within the membrane wall which, for example, as a rule hold back albumen in the retentate up to 90%, and pore sizes which separate plasma from blood cells. Membranes containing the latter are particularly suitable for microfiltration. The stretching has a great influence on the efficiency of separation and the flow rate.

For the choice of core liquid and precipitation bath liquid the following combinations have turned out to be particularly advantageous:

The core liquid contains caustic soda and the precipitation bath liquid contains glycol.

The core liquid is a 1 to 10% by weight NaOH-containing caustic soda, and the precipitation bath liquid is a 15 to 30% by weight glycol-containing solution in water.

The core liquid is a 5 to 10% by weight NaOH-containing caustic soda, and the precipitation bath liquid is water.

The core liquid contains caustic soda, and the precipitation bath liquid contains formic acid.

The core liquid is a 1 to 10% by weight NaOH-containing caustic soda, and the precipitation bath liquid contains 20 to 40% by weight formic acid.

The core liquid contains polyethylene glycol and the precipitation bath liquid contains formic acid.

The core liquid contains 15 to 30% by weight polyethylene glycol in water, and the precipitation bath liquid contains 20 to 40% by weight formic acid.

The core liquid contains polyethylene glycol, and the precipitation bath liquid contains NaOH.

The core liquid contains 15 to 30% by weight polyethylene glycol in water, and the precipitation bath liquid is a 1 to 10% by weight NaOH-containing caustic soda.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

A substantially homogeneous mixture of polyamide, polyethylene glycol and formic acid is used as spinning solution. The spinning solution is spun with a core liquid from a customary hollow filament nozzle, whereby the exit orifice of the hollow filament nozzle lies below the precipitation bath surface. The discharge of the hollow filaments is effected at an angle less than 45° from the vertical, whereby the filaments first become picked up by a first take-up roller after about 1.5 m. After leaving the precipitation bath, the filaments are washed with water, stretched and dried. The hollow filament membranes produced in this manner have a lumen between 300 and 1,200μ and a wall thickness from 100 up to 300μ.

The process parameters and the characteristics of different hollow filament membranes produced according to the process of the present invention are summarized in the following Table. Example 1 is a comparison example. In comparison with Example 2, it is clear that the stretching of the hollow filament membranes has a great influence on the ultrafiltration efficiency.

The ultrafiltraiton efficiency is determined in the following manner: Several hollow filaments are embedded into plastic at both ends. The embedding mass at both ends is then cut so that the hollow filament ends are open, exposing the orifices. At one end a burette, and at the other end a cut-off, e.g. a valve, are connected. The hollow filaments are filled with water and de-aerated. Thereupon the system is provided with a pressure of 0.2 bar, and the removal of water into the burette is determined.

The hollow filaments have centrical, eccentrical or profiled form, according to the spinning nozzle used.

By centric form is to be understood that the wall thickness remains the same along the circumference of the hollow filaments, whereas with the eccentric form the wall thickness along the circumference of the hollow filaments increases at least once continuously up to a maximal thickness and decreases to a minimum thickness.

By profiled form is to be understood that the cross section is formed profiled perpendicular to the filament axis, i.e. provided with rib-like thickenings, circular, elliptical or polygonal.

TABLE

| Example | Spinning Solution | Core Liquid | Setting Bath | Stretching | Ultrafiltration Efficiency $l/m^2h \cdot bar$ | Cutoff Dalton |
|---|---|---|---|---|---|---|
| 1 | 100 g PA 6 (Mn = 33,800) 390 g formic acid (80%) 30 g PEG 600 | water | 2% formic acid | — | 100 | |
| 2 | 100 g PA 6 (Mn = 33,800) 390 g formic acid (80%) 30 g PEG 600 | water | 2% formic acid | 1:1.5 | 300 | 100,000 |
| 3 | 100 g PA 6 (Mn = 20,000) 400 g formic acid (80%) 30 g PEG 600 | 1% caustic soda | water | 1:1.5 | 48 | 50,000 |
| 4 | 100 g PA 6 (Mn = 20,000) 400 g formic acid (80%) 30 g PEG | 1% caustic soda | 20% formic acid | 1:1.5 | 500 | 500,000 |
| 5 | 185 g PA 6 (Mn = 20,000) 815 g formic acid (80%) 30 g PEG 600 | 40% PEG 600 in water | 1% caustic soda | 1:2 | 1800 | 1,000,000 |

It will be understood that each of the elements described above, or two or more together, may also find a useful application in other types of filaments or membranes differing from the types described above.

While the invention has been illustrated and described as embodied in asymmetrical hollow filament membranes of polyamide and processes for their production, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Process for the production of an asymmetrical hollow filament membrane suitable for ultrafiltration and/or microfiltration, comprising extruding a spinning solution composed of a polyamide or a mixture of polyamides and/or copolyamides with formic acid and a coagulating core liquid into a coagulating setting bath liquid different from the core liquid, stretching hollow filaments produced thereby, in the wet state, after leaving the setting bath and then drying the hollow filaments, wherein said spinning solution containing 15 to 25% by weight of polyamide, 5 to 20% by weight polyethylene glycol, up to 10% by weight customary additive and formic acid and the pH-value difference between core liquid and setting bath liquid is at least 3.

2. Process according to claim 1, wherein the hollow filaments are stretched about 1:1.5 up to 1:2.5.

3. Process according to claim 1, wherein the core liquid contains caustic soda and the setting bath liquid contains glycol.

4. Process according to claim 3, wherein the core liquid is a 1 to 10% by weight NaOH-containing caustic soda and the setting bath liquid is a 15 to 30% glycol-containing solution in water.

5. Process according to claim 1, wherein the core liquid is a 5 to 10% by weight NaOH-containing caustic soda and the setting bath liquid is water.

6. Process according to claim 1, wherein the core liquid contains caustic soda and the setting bath liquid contains formic acid.

7. Process according to claim 6, wherein the core liquid is a 1 to 10% by weight NaOH-containing caustic soda and the setting bath liquid contains 20 to 40% by weight formic acid.

8. Process according to claim 1, wherein the core liquid contains polyethylene glycol and the setting bath liquid contains formic acid.

9. Process according to claim 8, wherein the core liquid contains 15 to 30% by weight polyethylene glycol in water and the setting bath liquid contains 20 to 40% by weight formic acid.

10. Process according to claim 1, wherein the core liquid contains polyethylene glycol and the setting bath liquid contains NaOH.

11. Process according to claim 10, wherein the core liquid contains 15 to 30% by weight polyethylene glycol in water and the setting bath liquid is a 1 to 10% by weight NaOH-containing caustic soda.

* * * * *